US012806699B2

(12) United States Patent
Ishi et al.

(10) Patent No.: US 12,806,699 B2
(45) Date of Patent: Nov. 24, 2026

(54) CUTTING TOOL AND METHOD FOR MANUFACTURING MACHINED PRODUCT

(71) Applicant: KYOCERA CORPORATION, Kyoto (JP)

(72) Inventors: Hirohisa Ishi, Moriyama (JP); Hirokazu Hatano, Otsu (JP)

(73) Assignee: KYOCERA CORPORATION, Kyoto (JP)

( * ) Notice: Subject to any disclaimer, the term of this patent is extended or adjusted under 35 U.S.C. 154(b) by 263 days.

(21) Appl. No.: 18/725,129

(22) PCT Filed: Dec. 12, 2022

(86) PCT No.: PCT/JP2022/045635

§ 371 (c)(1),
(2) Date: Jun. 28, 2024

(87) PCT Pub. No.: WO2023/132189

PCT Pub. Date: Jul. 13, 2023

(65) Prior Publication Data

US 2025/0121443 A1 Apr. 17, 2025

(30) Foreign Application Priority Data

Jan. 7, 2022 (JP) ................................ 2022-001788

(51) Int. Cl.
*B23C 5/06* (2006.01)

(52) U.S. Cl.
CPC .......... *B23C 5/06* (2013.01); *B23C 2210/204* (2013.01)

(58) Field of Classification Search
CPC ........... B23C 5/20; B23C 5/22; B23C 5/2226; B23C 5/2252; B23C 5/2278; B23C 5/2306
See application file for complete search history.

(56) References Cited

U.S. PATENT DOCUMENTS 3,239,911 A * 3/1966 Williams .............. B23C 5/2468 407/94
3,270,396 A * 9/1966 Williams .............. B23C 5/2265 407/50
4,097,174 A * 6/1978 Heinlein ............... B23C 5/2226 407/56
(Continued)

FOREIGN PATENT DOCUMENTS

DE 3314126 C2 * 4/1983
JP S6039004 A * 2/1985
(Continued)

*Primary Examiner* — Nicole N Ramos
(74) *Attorney, Agent, or Firm* — HAUPTMAN HAM, LLP

(57) ABSTRACT

A cutting tool has a main body and a cutting part. The main body extends from a front end toward a rear end along a rotation axis, and has a pocket located on a side of the front end. The cutting part is located in the pocket. The cutting part has a front end surface, a front lateral surface, an outer lateral surface, an inner lateral surface located on a side opposite to the outer lateral surface, and a cutting edge. The front end surface has a slit which is located on a rear side and extends toward the rear end. The slit opens into the outer lateral surface and the inner lateral surface, and is inclined so as to be separated from the front lateral surface as getting closer to the rear end.

11 Claims, 10 Drawing Sheets

(56) References Cited

U.S. PATENT DOCUMENTS

| | | | | | |
|---|---|---|---|---|---|
| 4,428,704 | A * | 1/1984 | Kalokhe | B23B 29/03421 | 407/89 |
| 4,547,100 | A * | 10/1985 | Naccarato | B23C 5/2252 | 407/46 |
| 4,708,536 | A * | 11/1987 | Sullivan | B23C 5/2269 | 407/41 |
| 4,780,029 | A * | 10/1988 | Beck | B23B 29/04 | 407/77 |
| 5,709,510 | A * | 1/1998 | Scheer | B23B 29/03421 | 408/156 |
| 6,511,264 | B2 * | 1/2003 | Ripley | B23C 5/2493 | 407/43 |
| 6,942,432 | B2 * | 9/2005 | Noggle | B23C 5/2472 | 407/46 |
| 7,156,588 | B2 * | 1/2007 | Elbaz | B23B 27/04 | 407/46 |
| 8,092,124 | B2 * | 1/2012 | Spichtinger | B23C 5/2462 | 407/46 |
| 8,985,916 | B2 * | 3/2015 | Kocherovsky | B25B 23/142 | 407/46 |
| 11,458,553 | B2 * | 10/2022 | Kondou | B23C 5/2226 | |
| 2004/0161311 | A1 * | 8/2004 | Satran | B23C 5/2226 | 407/101 |
| 2004/0191008 | A1 * | 9/2004 | Noggle | B23C 5/2226 | 407/46 |
| 2007/0127992 | A1 * | 6/2007 | Spichtinger | B23C 5/2462 | 407/45 |
| 2013/0071193 | A1 * | 3/2013 | Kocherovsky | B23B 29/0341 | 81/436 |
| 2014/0003872 | A1 * | 1/2014 | Kovac | B23C 5/22 | 407/46 |
| 2014/0212229 | A1 | 7/2014 | Diepold | | |
| 2019/0351493 | A1 * | 11/2019 | Kinoshita | B23C 5/24 | |
| 2020/0122249 | A1 * | 4/2020 | Kondou | B23C 5/06 | |
| 2025/0121443 | A1 * | 4/2025 | Ishi | B23C 5/10 | |

FOREIGN PATENT DOCUMENTS

| | | | | |
|---|---|---|---|---|
| JP | H042506 | U * | 1/1992 | |
| JP | 2005-111651 | A | 4/2005 | |
| JP | 2009095894 | A * | 5/2009 | B23C 5/2486 |
| WO | 2004080633 | A1 | 9/2004 | |
| WO | 2013029072 | A1 | 3/2013 | |

* cited by examiner

CUTTING TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2022/045635 filed on Dec. 12, 2022, which claims priority to Japanese Patent Application No. 2022-001788, filed Jan. 7, 2022. The contents of the application are incorporated herein by reference in its entirety.

TECHNICAL FIELD

The present disclosure relates to a cutting tool and a method for manufacturing a machined product. Examples of the cutting tool may include a so-called milling tool (a milling cutter). The milling tool is usable for milling processes, such as face milling and end milling.

BACKGROUND

As a cutting tool, milling tools have been known which are discussed in, for example, WO 2013/029072 (Patent Document 1), WO 2004/080633 (Patent Document 2), and Japanese Unexamined Patent Publication No. 2005-111651 (Patent Document 3). In general, in cases where face milling is carried out using the milling tool, a crossed line pattern might occur on a machined surface of a workpiece because a cutting edge comes into contact with the workpiece on a rear side in a feed direction.

A rotation axis of the milling tool is inclined toward a front side in the feed direction in the milling tools discussed in Patent Documents 1 and 2. This avoids a risk of causing the crossed line pattern on the machined surface of the workpiece. A flank part with respect to a wiper cutting edge in a direction along the rotation axis is given to the milling tool discussed in Patent Document 3. This avoids the risk of causing the crossed line pattern on the machined surface of the workpiece due to the flank part.

As discussed in Patent Documents 1 and 2, it is possible to tilt the rotation axis toward the front side in the feed direction in a machine whose machining direction is limited to a single axis as in a general-purpose milling cutter. However, it is difficult to apply this configuration to a general machining center, etc., whose machining direction is one or more axes. That is, the milling tools discussed in Patent Documents 1 and 2 lack versatility.

The wiper cutting edge located on the front side in the feed direction and the wiper cutting edge located on the rear side in the feed direction are identical in position along the rotation axis in the milling tool discussed in Patent Document 3. Therefore, the risk of crossed line pattern due to the flank part can be avoided, but the risk of the crossed line pattern due to the wiper cutting edges cannot be avoided.

SUMMARY

A cutting tool in an embodiment of the present disclosure has a main body and a cutting part. The main body extends from a front end toward a rear end along a rotation axis, and has a pocket located on a side of the front end. The cutting part is located in the pocket. The cutting part has a front end surface, a front lateral surface, an outer lateral surface, an inner lateral surface, and a cutting edge. The front end surface is located on a side of the front end. The front lateral surface connects to the front end surface and is located on a front side in a rotation direction of the rotation axis. The outer lateral surface connects to the front end surface and the front lateral surface, and is located outward in a radial direction of the rotation axis. The inner lateral surface is located on a side opposite to the outer lateral surface. The cutting edge is located on an intersection of the front end surface and the front lateral surface. The front end surface has a slit which is located on a rear side in the rotation direction with respect to the cutting edge, and extends toward the rear end. The slit opens into the outer lateral surface and the inner lateral surface, and is inclined so as to be separated from the front lateral surface as getting closer to the rear end.

EMBODIMENTS

Figure 1:
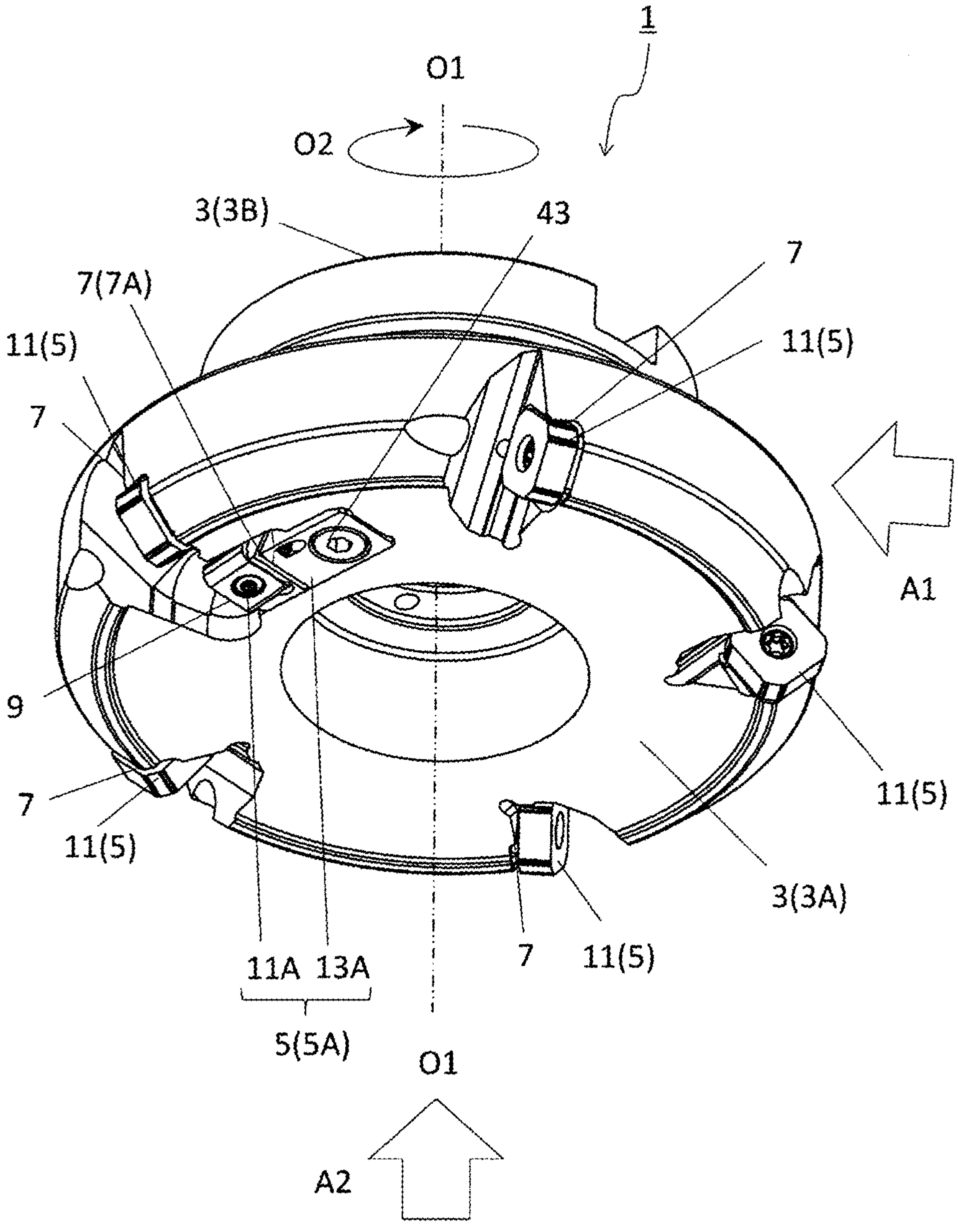
FIG. 1 is a perspective view illustrating a cutting tool in an embodiment.

A cutting tool 1 in a non-limiting embodiment of the present disclosure is described in detail below with reference to the drawings. For convenience of description, the drawings referred to in the following illustrate, in simplified form, only main members necessary for describing the embodiments. The cutting tool 1 of the present disclosure may therefore have any arbitrary structural member not illustrated in the drawings referred to. Dimensions of the members in each of the drawings faithfully represent neither dimensions of actual structural members nor dimensional ratios of these members. In a machining process, the term "during machining" means a state where the cutting tool 1 and a workpiece are in contact with each other, and the term "during non-machining" means a state where the cutting tool 1 and the workpiece are not in contact with each other.

Unless otherwise noted, the drawings illustrate the state of the cutting tool 1 during non-machining.

The cutting tool 1 in the embodiment has a rotation axis O1, and is a so-called rotary tool as in a non-limiting embodiment illustrated in FIG. 1. Examples of the rotary tool may have milling cutters and end mills. The rotary tool in the non-limiting embodiment illustrated in FIG. 1 is a milling cutter. The rotation axis O1 is an axis during rotation of the cutting tool 1, and is not included in the cutting tool 1 as a concrete object.

Figure 2:
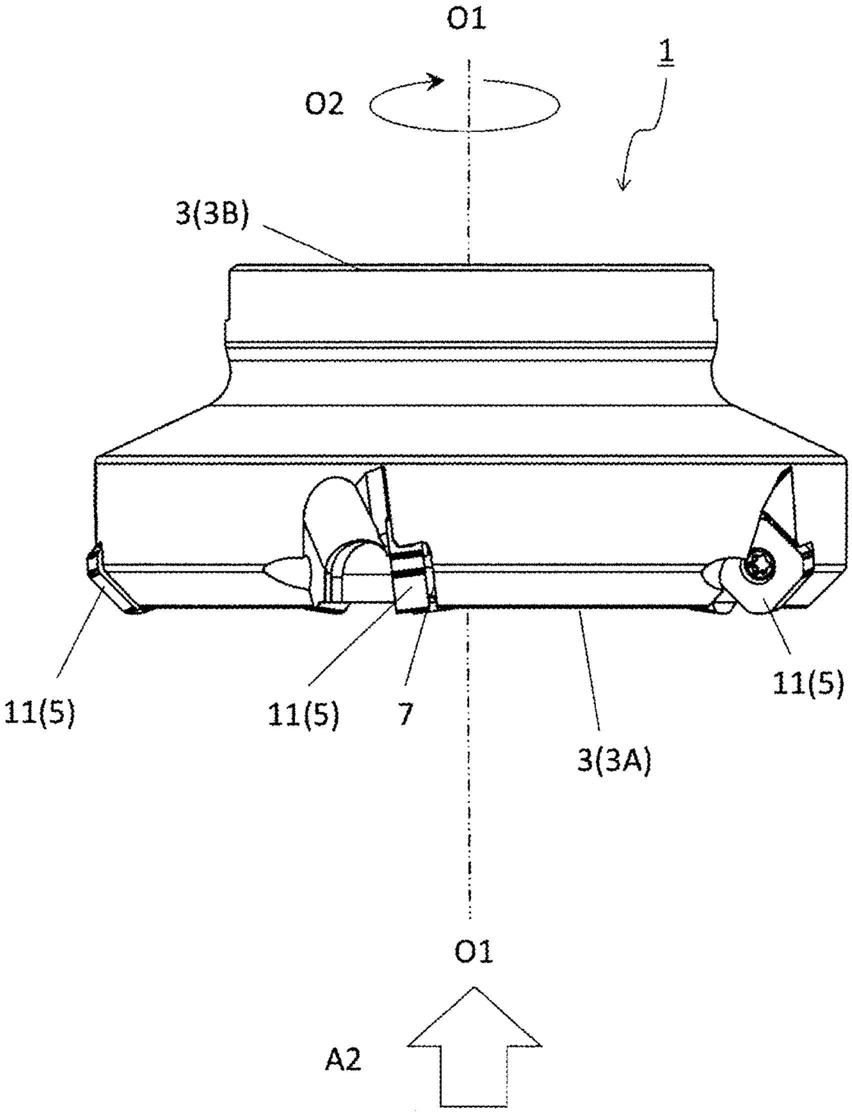
FIG. 2 is a plan view of the cutting tool illustrated in FIG. 1 as viewed from A1 direction.

The cutting tool 1 has a main body 3 and a cutting part 5 as in a non-limiting embodiment illustrated in FIG. 2, etc. The main body 3 extends along the rotation axis O1 from a front end 3A toward a rear end 3B. FIG. 2 is a drawing of the cutting tool 1 illustrated in FIG. 1 as viewed from A1 direction (as viewed from the side). The main body 3 has an insert pocket (pocket 7) located on a side of the front end 3A. The cutting part 5 located in the pocket 9 and has a cutting edge 9 located on a side of the front end 3A (refer to FIG. 1, etc.).

The main body 3 is a part that becomes a base of the cutting tool 1. The pocket 7 may open into an outer peripheral surface of the main body 3 and an end surface on a side of the front end 3A. There may be only one pocket 7, or there may be a plurality of pockets 7 as in the non-limiting embodiment illustrated in FIG. 1. If the main body 3 has the plurality of pockets 7, one of the plurality of pockets 7 is a first pocket 7A. The cutting parts 5 is not limited to having a single cutting part 5, but may have a plurality of cutting parts 5 as in the non-limiting embodiment illustrated in FIG. 1. If the main body 3 has the plurality of pockets 7, the cutting part 5 located in the first pocket 7A is a first cutting part 5A.

Figure 3:
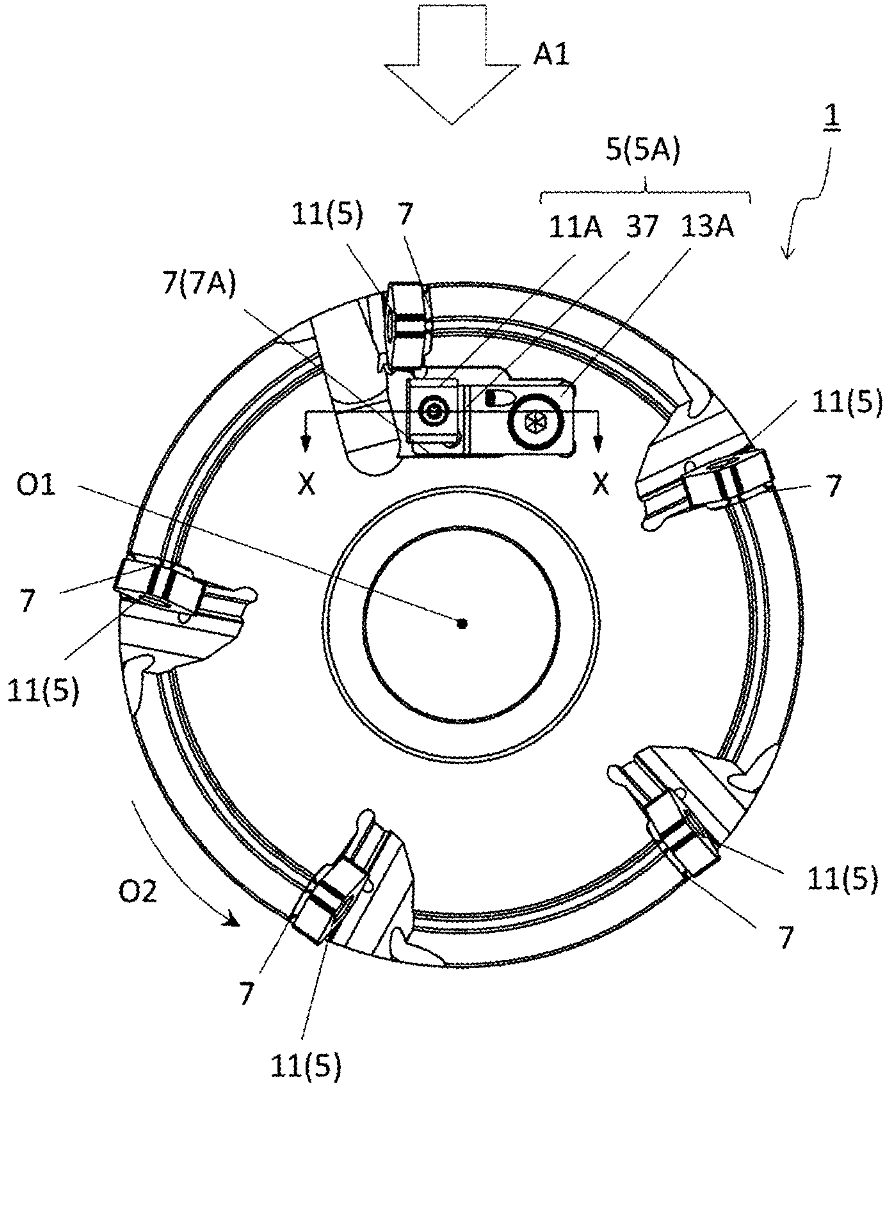
FIG. 3 is a plan view of the cutting tool illustrated in FIG. 1 as viewed from A2 direction.

The cutting tool 1 is rotatable counterclockwise around the rotation axis O1 as viewed from a side of the front end 3A as in a non-limiting embodiment illustrated in FIG. 3. A rotation direction O2 is not limited to a direction illustrated in FIG. 3. For example, in cases where the cutting tool 1 is configured to be reversed around the rotation axis O1 with respect to the configuration illustrated in FIG. 1, the rotation direction O2 may be a reverse direction. FIG. 3 is a drawing of the cutting tool 1 illustrated in FIG. 1 as viewed from A2 direction (a side of the front end 3A).

In the non-limiting embodiment illustrated in FIG. 1, the cutting tool 1 of the embodiment has an approximately disk shape extending along the rotation axis O1 from the front end 3A toward the rear end 3B. For convenience of description, a part located on a side of the front end 3A and a part located on a side of the rear end 3B in the main body 3 may be respectively referred to as a first end 3A and a second end 3B. As is clear from the fact that the cutting tool 1 has the first pocket 7A, etc., the cutting tool 1 does not have a strict disk shape. A length of the main body 3 in a direction along the rotation axis O1 is, for example, 50-100 mm. A length of the main body 3 in a radial direction of the rotation axis O1 is, for example, 100-300 mm.

The main body 3 is rotatable around the rotation axis O1. There are no special limitations imposed on the shape of the main body 3. The main body 3 may have concave-convex portions, etc. The main body 3 may be configured with one member as in the non-limiting embodiment illustrated in FIG. 1, or may be configured with a plurality of members.

The cutting part 5 may be attached to each of the pockets 7. The cutting part 5 may be attached to the plurality of pockets 7 other than the first pocket 7A as in the non-limiting embodiment illustrated in FIG. 3. The first pocket 7A may connect to the pocket 7 other than the first pocket 7A. The first pocket 7A may be located on a side closer to the rotation axis O1 than the pockets 7 other than the first pocket 7A.

The cutting part 5 may be configured with one or a plurality of members. For example, the cutting part 5 may have a cutting insert (insert 11) and a cartridge 13. If the first cutting part 5A has the insert 11 and the cartridge 13, the insert 11 in the first cutting part 5A is a first insert 11A, and the cartridge 13 in the first cutting part 5A is a first cartridge 13A.

The first cutting part 5A located in the first pocket 7A has a cutting edge 9 located on a side of the first end 3A. The first insert 11A has the cutting edge 9 in a non-limiting embodiment illustrated in FIG. 4. A machined product is manufacturable by machining a workpiece with the cutting edge 9.

The cutting edge 9 is located on a front side in a rotation direction O2 and on a side of the first end 3A in the first insert 11A. Specifically, the cutting edge 9 is located on an intersection of a front end surface 19 and a front lateral surface 23 described later. The cutting edge 9 may be located in the whole or a part of the intersection. The cutting edge 9 need not be located only in the part. For example, if the cutting edge 9 located on the front side in the rotation direction O2 and on the side of the first end 3A in the first insert 11A is referred to as a first cutting edge 15, the first insert 11A may further have a second cutting edge 17 located on the front side in the rotation direction O2 and on an outer peripheral side in the first insert 11A.

The first cutting edge 15 is protruded from the main body 3, and is located on a side of the first end 3A. The second cutting edge 17 may be protruded more toward an outer periphery than the main body 3. In general, the first cutting edge 15 located on the side of the first end 3A is called a bottom cutting edge, and the second cutting edge 17 located closer to the outer periphery is called an outer peripheral cutting edge.

The first cutting edge 15 and the second cutting edge 17 may be located on the outer peripheral side in the cutting insert 11. The first cutting edge 15 and the second cutting edge 17 are not limited to having a straight line shape, but may have a gentle curvilinear shape.

The first insert 11A is located on a side of the first end 3A and on a front side in the rotation direction O2 with respect to the first cartridge 13A. For example, the first insert 11A may be fixed to the first cartridge 13A with a screw, etc. as in a non-limiting embodiment illustrated in FIG. 7.

Figure 4:
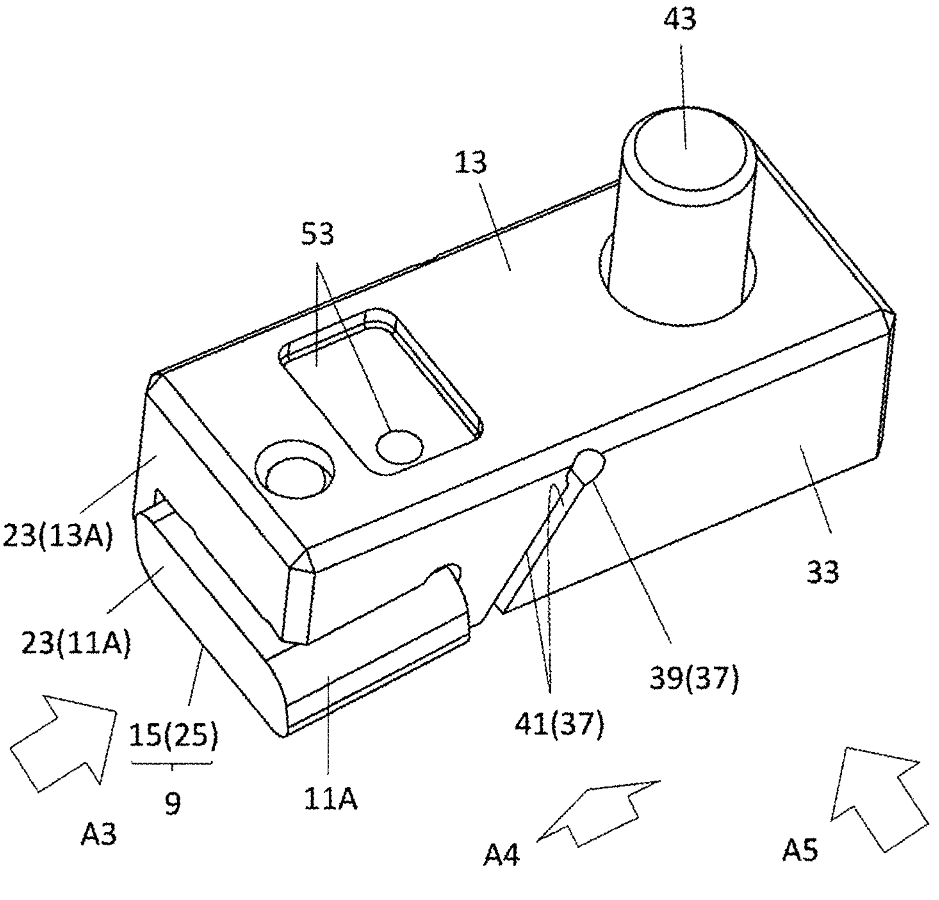
FIG. 4 is a perspective view illustrating a first cutting part and a fixture in the cutting tool illustrated in FIG. 1 as viewed from a side of a rear end.
Figure 5:
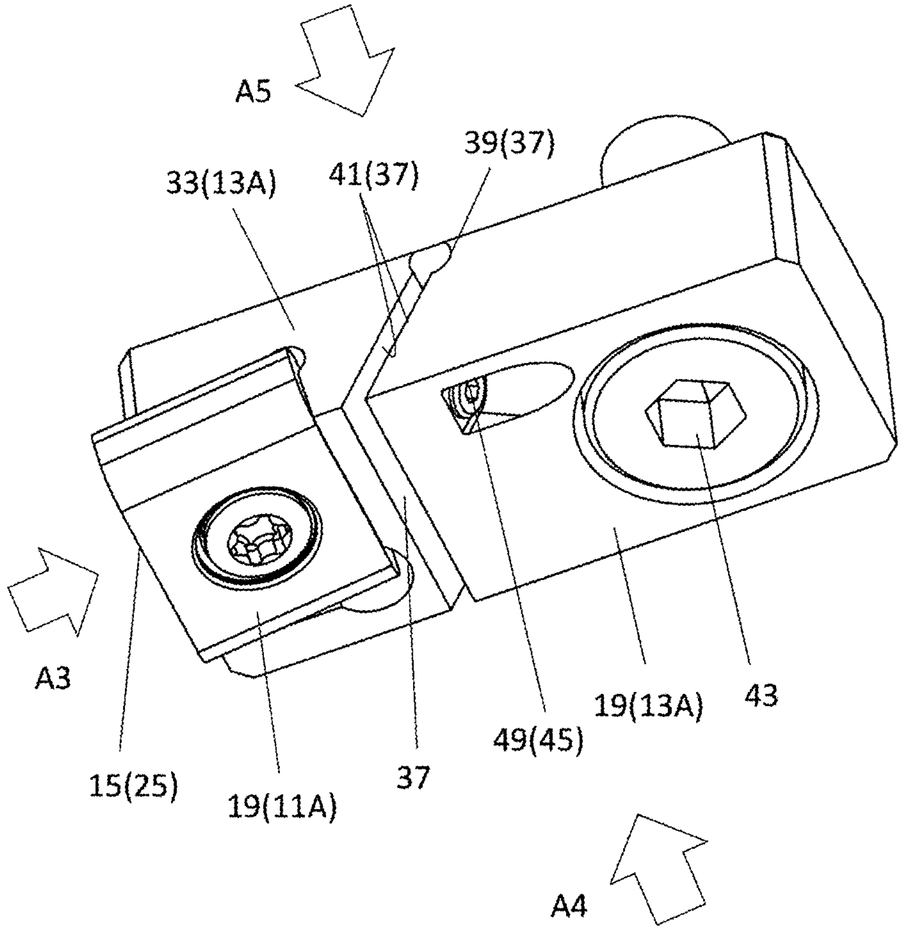
FIG. 5 is a perspective view illustrating the first cutting part and the fixture in the cutting tool illustrated in FIG. 1 as viewed from a side of a front end.

The first cutting part 5A may have a quadrilateral plate shape as in the non-limiting embodiment illustrated in FIG. 4, etc. As in the non-limiting embodiment illustrated in FIG. 3, the first cutting part 5A may have a rectangular shape as viewed from a side of the first end 3A. In the non-limiting embodiment illustrated in FIG. 3, the first cutting part 5A is attached so that the radial direction of the rotation axis O1 can be a short side, and a circumferential direction of the rotation axis O1 can be a long side. A length of the first cutting part 5A in a direction along the rotation axis O1 is, for example, 4-7 mm. A length of the first cutting part 5A in the radial direction, specifically the short side described above is, for example, 12-15 mm. A length of the first cutting part 5A in the circumferential direction of the rotation axis O1, specifically the long side described above is, for example, 30-40 mm.

The first cutting part 5A has a front end surface 19. The front end surface 19 is the surface located on a side of the first end 3A in the first cutting part 5A. The front end surface 19 may be configured with one member, or may be configured with a plurality of members as in the non-limiting embodiment illustrated in FIG. 7, etc.

Figure 7:
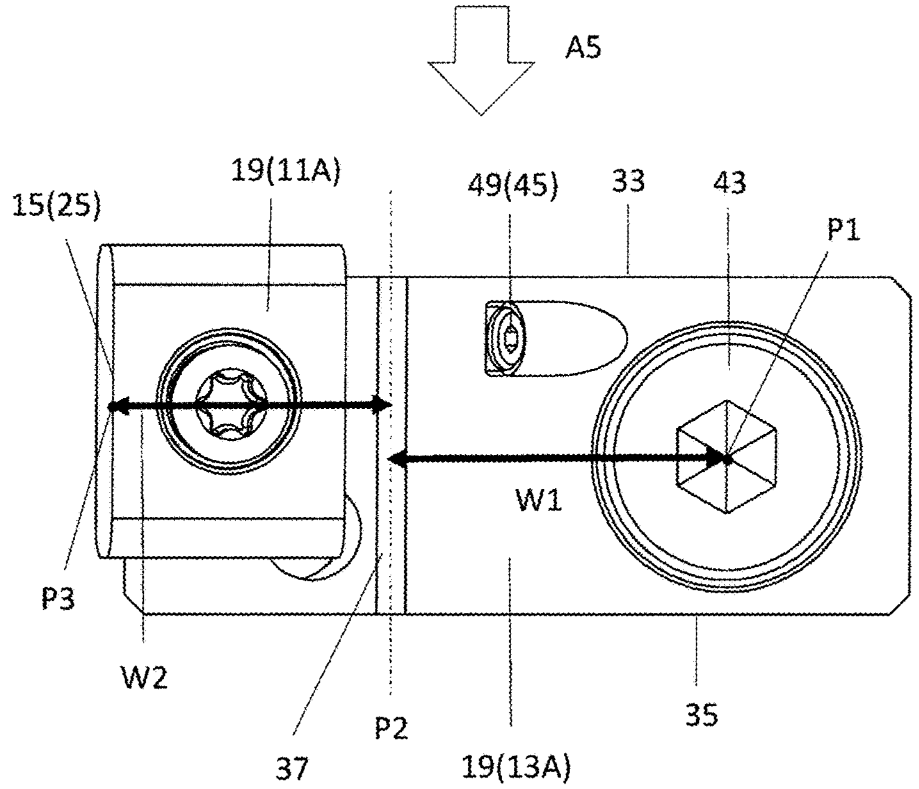
FIG. 7 is a plan view of the part illustrated in FIG. 4 as viewed from A4 direction.

For example, the front end surface 19 may be configured with a surface located on a side of the first end 3A in the rotation direction O2 in the first insert 11A and the first cartridge 13A as in the non-limiting embodiment illustrated in FIG. 7. The front end surface 19 is not particularly limited in terms of shape, but may have, for example, a planar shape or curved surface shape, or may have concave and convex portions. The front end surface 19 has the rectangular shape as described above in the non-limiting embodiment illustrated in FIG. 3.

The first cutting part 5A may have a rear end surface 21. The rear end surface 21 is the surface located on a side of the second end 3B in the first cutting part 5A. The rear end surface 21 is not particularly limited in terms of shape, but may have, for example, a planar shape or curved surface shape, or may have concave and convex portions.

The first cutting part 5A has a front lateral surface 23. The front lateral surface 23 is the surface which connects to the front end surface 19 and is located on a front side in the rotation direction O2 in the first cutting part 5A. The front lateral surface 23 may be configured with one member, or may be configured with a plurality of members as in a non-limiting embodiment illustrated in FIG. 6, etc. For example, the front lateral surface 23 may be configured with a surface located on the front side in the rotation direction O2 in the first insert 11A and the first cartridge 13A as in the non-limiting embodiment illustrated in FIG. 6. The front lateral surface 23 is not particularly limited in terms of shape, but may have, for example, a planar shape or curved surface shape, or may have concave and convex portions.

The front lateral surface 23 may have a first side 25, a second side 27, and a first corner 29. The first side 25 may be located on a side of the first end 3A. The second side 27 may be located on a side of the outer periphery away from the rotation axis O1. The first corner 29 is the corner connecting to the first side 25 and the second side 27. The term "corner" as used herein is not limited to a point where two sides intersect with each other, but the corner may be macroscopically a region where the two sides intersect with each other, and may be microscopically a curvilinear shape or a straight line shape inclined relative to each of the two sides.

The first cutting edge 15 may be located on the first side 25. Because the first side 25 is located on the side of the first end 3A as described above, the first cutting edge 15 located on the first side 25 can be located on a side of the first end 3A in the first cutting part 5A. The second cutting edge 17 may be located on the second side 27. Because the second side 27 is located on the outer peripheral side as described above, the second cutting edge 17 located on the second side 27 can be located on the outer peripheral side in the first cutting part 5A.

The first cutting part 5A may have a third cutting edge 31 located on the first corner 29. The third cutting edge 31 may connect to the first cutting edge 15 and the second cutting edge 17. The third cutting edge 31 is not limited to having a curvilinear shape, but may have a part having a straight line shape, or may have a circular arc shape.

The first cutting part 5A has an outer lateral surface 33. The outer lateral surface 33 is the surface connecting to the front end surface 19 and the front lateral surface 23. The outer lateral surface 33 is located outward in the radial direction of the rotation axis O1, specifically the outer peripheral side in the first cutting part 5A. The outer lateral surface 33 may be configured with one member or a plurality of members. The outer lateral surface 33 is not particularly limited in terms of shape, but may have, for example, a planar shape or curved surface shape, or may have concave and convex portions.

The first cutting part 5A has an inner lateral surface 35. The inner lateral surface 35 is located on a side opposite to the outer lateral surface 33. The inner lateral surface 35 may be the surface connecting to the front end surface 19 and the front lateral surface 23. The inner lateral surface 35 may be configured with one member or a plurality of members. The inner lateral surface 35 is not particularly limited in terms of shape, but may have, for example, a planar shape or curved surface shape, or may have concave and convex portions.

The front end surface 19 has a slit 37. Specifically, the first cutting part 5A has the slit 37 that opens into the front end surface 19. The slit 37 is located on a rear side in the rotation direction O2 with respect to the first cutting edge 15 (cutting edge 9). The slit 37 extends toward a side of the second end 3B.

The slit 37 opens into the outer lateral surface 33 and the inner lateral surface 35. The slit 37 may extend in the radial direction of the rotation axis O1 as in the non-limiting embodiment illustrated in FIG. 3. The slit 37 may be inclined so as to be separated from the front lateral surface 23 as getting closer to a side of the second end 3B as in a non-limiting embodiment illustrated in FIG. 9.

Figure 10:
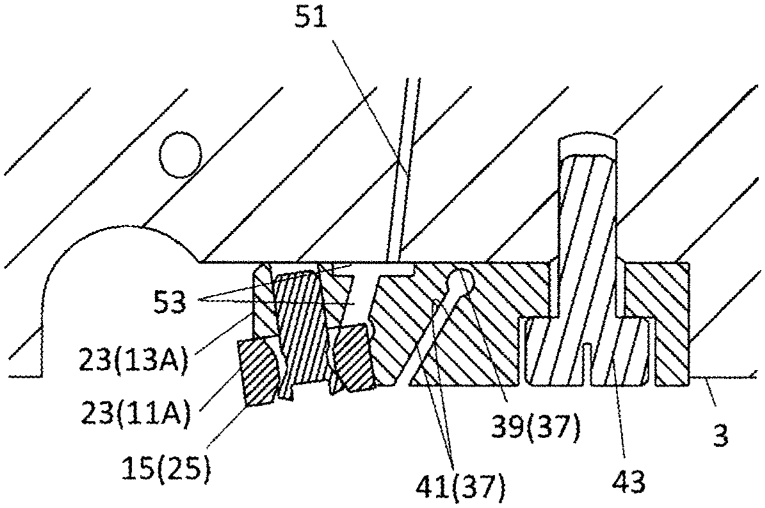
FIG. 10 is an enlarged view of a cross section taken along line X-X illustrated in FIG. 3.

The slit 37 may be inclined toward a rear side in the rotation direction O2 as getting closer to the second end 3B in a cross section parallel to the rotation axis O1 as in a non-limiting embodiment illustrated in FIG. 10. FIG. 10 is a cross section obtained by cutting the part illustrated in FIG. 3 along line X-X. The cross section taken along the line X-X is the cross section which passes through a center of the first insert 11A and is parallel to the rotation axis O1.

Figure 11:
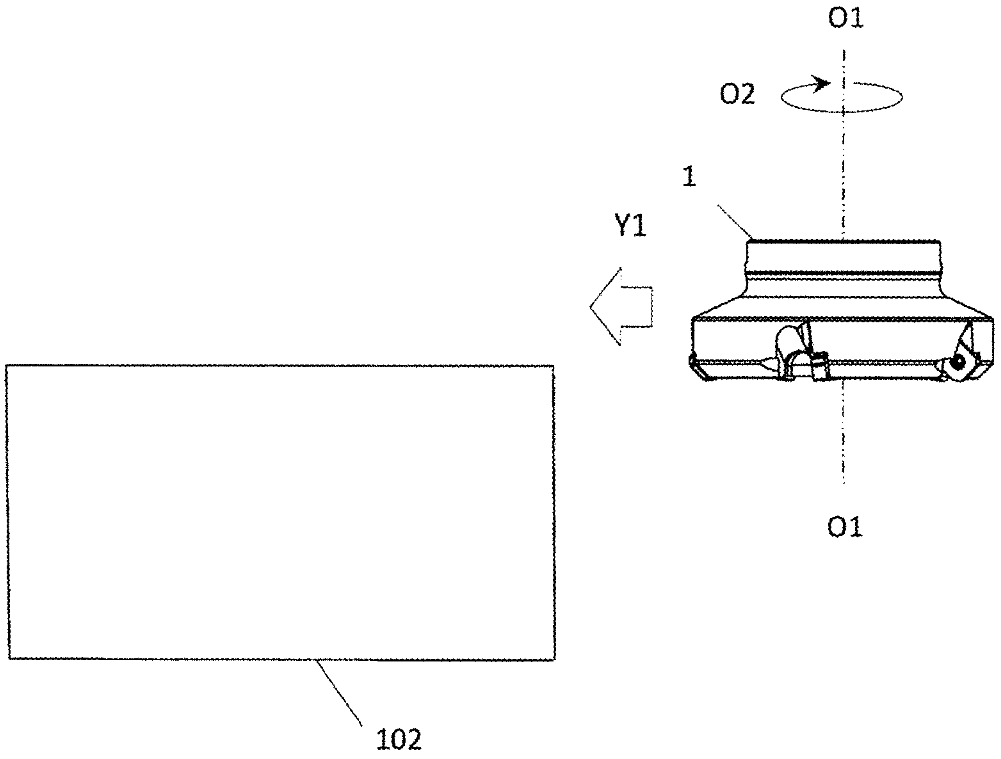
FIG. 11 is a schematic explanatory diagram illustrating one of steps in a method for manufacturing a machined product in one embodiment.

The cutting tool 1 moves toward a predetermined direction (so-called feed direction) while rotating around the rotation axis O1 during a machining process of a workpiece as in a non-limiting embodiment illustrated in FIG. 11. The first cutting part 5A is capable of contributing to the machining process while being located on a front side in the feed direction with respect to the rotation axis O1. In contrast, the first cutting part 5A does not contribute to the machining process while being located on a rear side in the feed direction with respect to the rotation axis O1. Thus, it is possible to avoid the risk of formation of a crossed line pattern generated in contact with the workpiece when the first cutting part 5A is located on a rear side in the feed direction with respect to the rotation axis O1.

Figure 8:
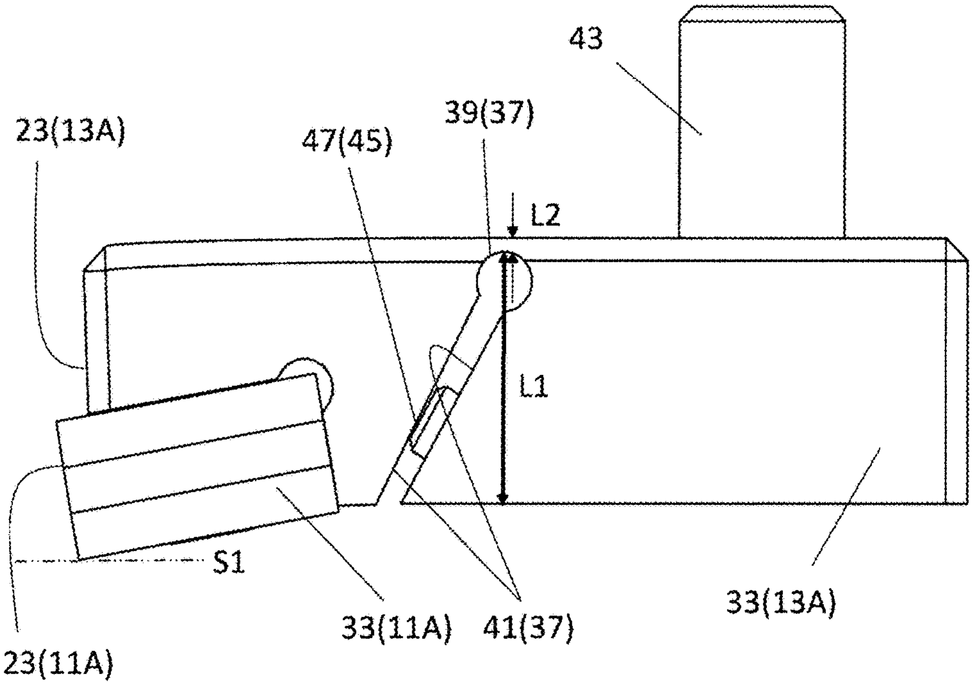
FIG. 8 is a plan view of the part illustrated in FIG. 4 as viewed from A5 direction, specifically, a diagram illustrating a state during machining.

If the first cutting part 5A comes into contact with the workpiece during the machining process of the workpiece, a cutting load tends to be applied from the workpiece to the first cutting part 5A in an approaching direction to the workpiece. Therefore, the first cutting part 5A is elastically deformed in a direction in which a width of the slit 37 disposed in the first cutting part 5A becomes narrower, and a part located on a more front side in the rotation direction O2 than the slit 37 in the first cutting part 5A moves in the approaching direction to the workpiece. Consequently, the first cutting edge 15 enters the workpiece to perform the machining process. At this time, the position of the first cutting edge 15 during machining is a first cutting edge position S1 (refer to FIG. 8). FIG. 8 illustrates states of the first cutting part 5A, etc. illustrated in FIG. 4 during machining.

While the first cutting part 5A is located on a rear side in the feed direction with respect to the rotation axis O1, the first cutting part 5A that has been elastically deformed returns to its original state. That is, the first cutting edge 15 moves toward the second end 3B on the basis of the first cutting edge position S1. Accordingly, the first cutting edge 15 is located closer to the second end 3B while the first cutting part 5A is located on the rear side in the feed direction with respect to the rotation axis O1 than while the first cutting part 5A is located on the front side in the feed direction with respect to the rotation axis O1.

Figure 9:
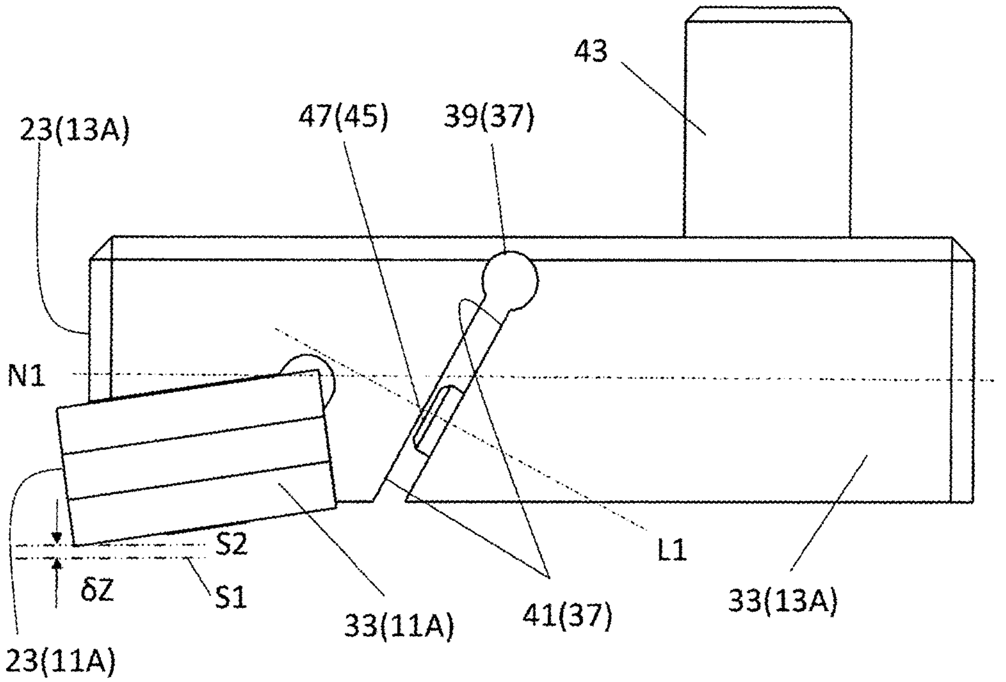
FIG. 9 is a diagram illustrating a state of the part illustrated in FIG. 8 during non-machining.

At this time, the position of the first cutting edge 15 during non-machining is a second cutting edge position S2 (refer to FIG. 9). FIG. 9 is a diagram corresponding to FIG. 8, and illustrates states of the first cutting part 5A, etc. illustrated in FIG. 4 during non-machining. A difference (δZ) between the first cutting edge position S1 and the second cutting edge position S2 in a direction along the rotation axis O1 is, for example, 0.05-0.2 mm.

The first cutting edge 15 is located on the side of the second end 3B while the first cutting part 5A is located on the rear side in the feed direction with respect to the rotation axis O1 than a situation where the first cutting part 5A is located on the front side in the feed direction with respect to the rotation axis O1. Accordingly, the first cutting part 5A is less likely to come into contact with the workpiece.

The risk of the crossed line pattern can be reduced by the foregoing actions. In addition, because the above machining process can be carried out without tilting the rotation axis O1 of the cutting tool 1 toward the front side in the feed direction, a machining direction is not limited to one direction, thereby reducing a movement distance of the tool. Hence, the foregoing actions are highly versatile and also contribute to reducing machining time.

The slit 37 need not necessarily be so inclined as to be separated from the front lateral surface 23 as getting closer to the second end 3B, but may have a portion slightly inclined in an approaching direction to the front lateral surface 23, or a portion parallel to the rotation axis O1 as long as the above operational effect can be achieved.

The slit 37 is not limited to having an aperture in an interior thereof. For example, the interior of the slit 37 may be filled with resin or rubber. Examples of the resin may include polycarbonate resin, polyethylene terephthalate resin, acrylic resin, polyvinyl chloride resin, silicone resin, and epoxy resin. Examples of the rubbers may include natural rubbers and synthetic rubbers.

The slit 37 may have a bottom part 39 located on a side of the second end 3B, and a pair of inner wall surfaces 41 connecting to the bottom part 39. The bottom part 39 may have a circular shape in a side view as in a non-limiting embodiment illustrated in FIG. 8. Thus, if the bottom part 39 has the circular shape, it is possible to reduce the risk of stress concentration on the bottom part 39 of the slit 37. The pair of inner wall surfaces 41 may be individually flat or may be parallel to each other.

In the non-limiting embodiment illustrated in FIG. 8, a length L1 from the front end surface 19 to the bottom part 39 of the slit 37 is larger than a length L2 from the bottom part 39 of the slit 37 to the rear end surface 21 of the first cutting part 5A in an extending direction of the rotation axis O1. A ratio L1/L2 of the length L1 and the length L2 may be, for example, 4 to 20. In this case, because a region located from the bottom part 39 of the slit 37 to the rear end surface 21 of the first cutting part 5A does not become too thin, a region extending from the bottom part 39 of the slit 37 to the rear end surface 21 of the first cutting part 5A does not become too thick while maintaining durability of the first cutting part 5A. Therefore, the first cutting part 5A is smoothly elastically deformable during machining.

An extending direction of the slit 37 is not particularly limited as viewed from a side of the first end 3A. For example, the slit 37 may be parallel to the first cutting edge 15 (cutting edge 9) as viewed from the side of the first end 3A (as viewed from the front end), as in the non-limiting embodiment illustrated in FIG. 7. In this case, a direction of main force of cutting load coincides with a direction of elastic deformation of the first cutting part 5A as viewed from a side of the first end 3A, thus leading to smooth elastic deformation of the first cutting part 5A. The term "parallel" as used herein means that an angle formed between the slit 37 and the first cutting edge 15 need not necessarily be 0°, but may include a deviation of approximately 1-2°.

The first insert 11A is a so-called insert for a wiper in the non-limiting embodiment illustrated in FIG. 1, etc. That is, the insert 11 other than the first insert 11A included in the cutting part 5 other than the first cutting part 5A is intended to perform normal milling with respect to a workpiece. The first insert 11A is the insert 11 for finishing in order to improve surface accuracy of a machined surface of the workpiece. At this time, the first insert 11A is protruded more toward the first end 3A than the cutting insert 11 other than the first insert 11A. The first cutting part 5A is located on a more inner peripheral side than the cutting part 5 other than the first cutting part 5A in the non-limiting embodiment illustrated in FIG. 3.

In the non-limiting embodiment illustrated in FIG. 3, the first cutting part 5A is located in the first pocket 7A to which the first insert 11A that is the insert for a wiper is attached, but is not located in the pocket 7 on the outer peripheral side to which the insert 11 that performs the normal milling is attached. With this configuration, it is possible to reduce the risk of the crossed line pattern while the cutting tool 1 has a required minimum number of cutting parts 5. That is, it is possible to minimize the number of the cutting parts 5 having a complicated structure, such as the slit 37, and manufacturing costs of the cutting tool 1 can be reduced while reducing the risk of the crossed line pattern.

The cutting tool 1 may have a fixture 43. The fixture 43 is used for fixing the first cutting part 5A to the main body 3 in the non-limiting embodiment illustrated in FIG. 1. Examples of the fixture 43 may have a screw.

The fixture 43 is located on a more rear side in the rotation direction O2 than the slit 37 in the non-limiting embodiment illustrated in FIG. 7. With this configuration, the cutting part 5 can be stably fixed to the main body 3 without interference with elastic deformation of the first cutting part 5A. As to the term "rear side in the rotation direction O2" as used herein, a positional relationship in the extending direction of the rotation axis O1 is not particularly limited, but the fixture 43 need not necessarily be located behind the slit 37.

As viewed from a side of the first end 3A (as viewed from the front end), a distance W1 between the fixture 43 and the slit 37 may be larger than a distance W2 between the slit 37 and the first cutting edge 15 (cutting edge 9). With this configuration, the first cutting part 5A can be stably fixed because the fixture 43 is less likely to be affected by the elastic deformation of the first cutting part 5A caused by repetition of machining time and non-machining time. The above-mentioned distance may be evaluated as the distance W1 between a center P1 of the fixture 43 and a central line P2 of the slit 37, and as the distance W2 between a center P3 of the first cutting edge 15 and the central line P2 of the slit 37 in a circumferential direction of the rotation direction O2.

The first cutting part 5A may have an adjustment member 45 capable of adjusting an amount of elastic deformation of the slit 37. The adjustment member 45 may have an end part 47, and the end part 47 may be located in the slit 37 as in the non-limiting embodiment illustrated in FIG. 9. In this case, if the first cutting part 5A is elastically deformed during machining, a part of the first cutting part 5A located on a side of the front lateral surface 23 abuts against the adjustment member 45. Thus, excessive protrusion of the first cutting edge 15 toward the first end 3A can be avoided, thereby adjusting the position of the first cutting edge 15 (first cutting edge position S1).

The adjustment member 45 may have a screw shape, and may have a screw head 49 as in the non-limiting embodiment illustrated in FIG. 7. In this case, a position of the end part 47 located in the slit 37 can be adjusted, and the position of the first cutting edge 15 can be adjusted according to fastening of the screw.

The screw head 49 may be directed toward the first end 3A in the non-limiting embodiment illustrated in FIG. 7. With this configuration, the adjustment member 45 is adjustable from a side of the first end 3A, and the position of the first cutting edge 15 is adjustable without removing the first cutting part 5A from the cutting tool 1, thus leading to improved operability.

Although the end part 47 located on a front side in the rotation direction O2 in the adjustment member 45 is located in the slit 37 in the non-limiting embodiment illustrated in FIG. 9, the end part 47 located on a rear side in the rotation direction O2 may be located in the slit 37. In this case, the screw head 49 may be directed toward the second end 3B.

The end part 47 may be located closer to an opening in the front end surface 19 than the bottom part 39 in the slit 37. With this configuration, the end part 47 can be easily located on a side of the first end 3A, thus achieving more fine position adjustment of the first cutting edge 15. The terms "being located closer to the opening in the front end surface 19 than the bottom part 38 in the slit 37" means that when bisecting a length from the opening of the slit 37 to a part on a side of the rear end surface 21 in the bottom part 39, the end part 47 is located closer to the first end 3A than a bisector N1 as in the non-limiting embodiment illustrated in FIG. 9.

The adjustment member 45 may be located closer to the outer lateral surface 33 than the inner lateral surface 35 as in the non-limiting embodiment illustrated in FIG. 7. A cutting load usually tends to be applied to a side closer to the outer lateral surface 33 than the inner lateral surface 35 in a machining process, and therefore, the side closer to the outer lateral surface 33 is subjected to a larger amount of elastic deformation of the first cutting part 5A. Hence, with the above configuration, the cutting load can be received by the adjustment member 45. This leads to improved durability of the slit 37 and enhanced positional accuracy of the first cutting edge 15.

A shape of the end part 47 is not particularly limited. For example, the end part 47 may have a planar shape. This leads to stable contact between the inner wall surface 41 and the end part 47, thereby stably holding the position of the first cutting edge 15. The term "planar shape" as used herein is not necessarily limited to a flat shape, but may be a slightly convex or concave shape.

The adjustment member 45 may be located behind the slit 37 as in the non-limiting embodiment illustrated in FIG. 7. The term "behind the slit 37" as used herein means that the whole of the adjustment member 45 need not be located behind the slit 37, but a part of the adjustment member 45, such as the end part 47, may be located in the slit 37 as in the non-limiting embodiment illustrated in FIG. 7.

A central axis L1 of the adjustment member 45 may extend vertically relative to the slit 37 as in the non-limiting embodiment illustrated in FIG. 9. The term "extending vertically" as used herein means that the central axis L1 of the adjustment member 45 may be vertical relative of the pair of inner wall surfaces 41 in the slit 37. If it is difficult to evaluate the above-mentioned relationship as viewed from a side of the outer lateral surface 33, an evaluation may be made in a cross section including the adjustment member 45 and the slit 37.

With the above configuration, a part located on a side of the front lateral surface 23 in the first cutting part 5A and the end part 47 can be in stable contact with each other, and therefore, the position of the first cutting edge 15 can be stably held. The term "vertical" as used herein means that an angle formed by the central axis L1 of the adjustment member 45 and the extending direction of the slit 37 need not necessarily be 90°, but it may include deviation of approximately 1-2°.

The main body 3 may have a first coolant hole 51. The first coolant hole 51 may extend from the second end 3B toward the first end 3A. The first coolant hole 51 may extend from a side of the second end 3B to a side of the first end 3A. The first coolant hole 51 may have a plurality of branches. The first coolant hole 51 permits flow of a coolant into the interior thereof.

The first cartridge 13A may have a second coolant hole 53. The second coolant hole 53 may extend from the second end 3B toward the first end 3A. The second coolant hole 53 may extend from a side of the second end 3B to a side of the first end 3A. The second coolant hole 53 connects to the first coolant hole 51 on a side of the second end 3B. The second coolant hole 53 may have a plurality of branches. The second coolant hole 53 permits flow of the coolant into the interior thereof.

Figure 6:
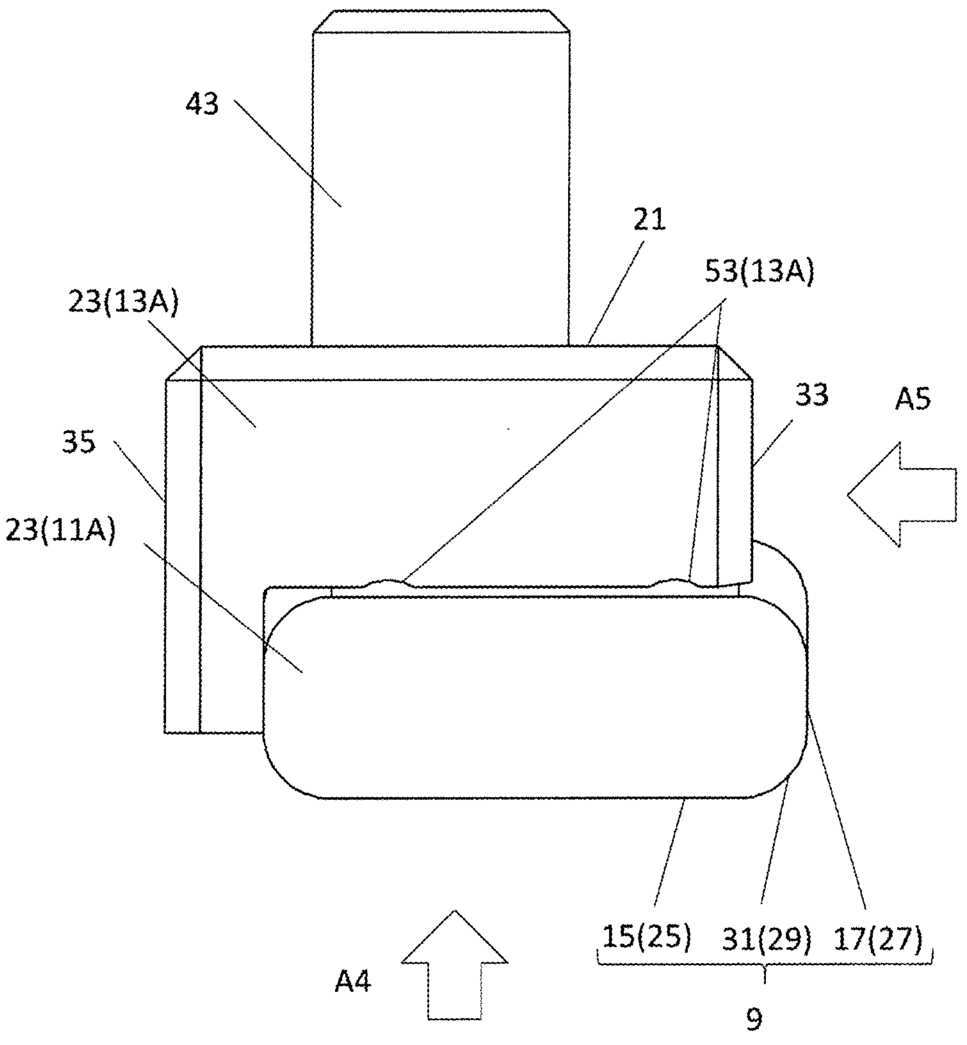
FIG. 6 is a plan view of a part illustrated in FIG. 4 as viewed from A3 direction.

The second coolant hole 53 may extend along a surface located on a side of the rear end surface 21 of the first insert 11A, and may open into the front lateral surface 23 as in the non-limiting embodiment illustrated in FIG. 6. That is, the second coolant hole 53 may open toward an upper surface of the first insert 11A. With this configuration, it is possible to flow the coolant in a certain direction from a side of the second end 3B with respect to chips, thus leading to a stable discharge of the chips.

The second coolant hole 53 may be located on a more front side in the rotation direction O2 than the slit 37 as in a non-limiting embodiment illustrated in FIG. 10. That is, the second coolant hole 53 may be located on the more front side in the rotation direction O2 than the slit 37 in a cross section vertical to the cutting edge 9. With this configuration, the second coolant hole 53 can be located away from the slit 37 susceptible to load during machining in the first cutting part 5A, thereby reducing the risk of deformation or the like of the second coolant hole 53. As to the term "on the front side in the rotation direction O2" as used herein, a positional relationship in the extending direction of the rotation axis O1 is not particularly limited, and the second coolant hole 53 need not necessarily be located in front of the slit 37.

Examples of the coolant may include water-insoluble oils and water-soluble oils. Examples of water-insoluble oils may include oil-based, inert extreme-pressure type, and active extreme-pressure type cutting fluids. Examples of water-soluble oils may include emulsion, soluble, and solution type cutting fluids. The coolant is not limited to liquid, but may be gas, such as inert gas. The coolant may be appropriately selected and used according to the material a workpiece.

Method for Manufacturing Machined Product

Figure 12:
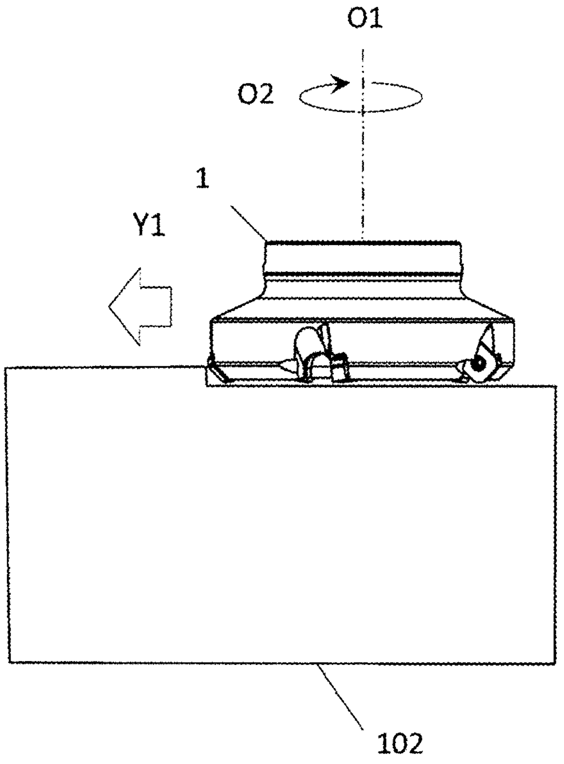
FIG. 12 is a schematic explanatory diagram illustrating one of the steps in the method for manufacturing a machined product in one embodiment.
Figure 13:
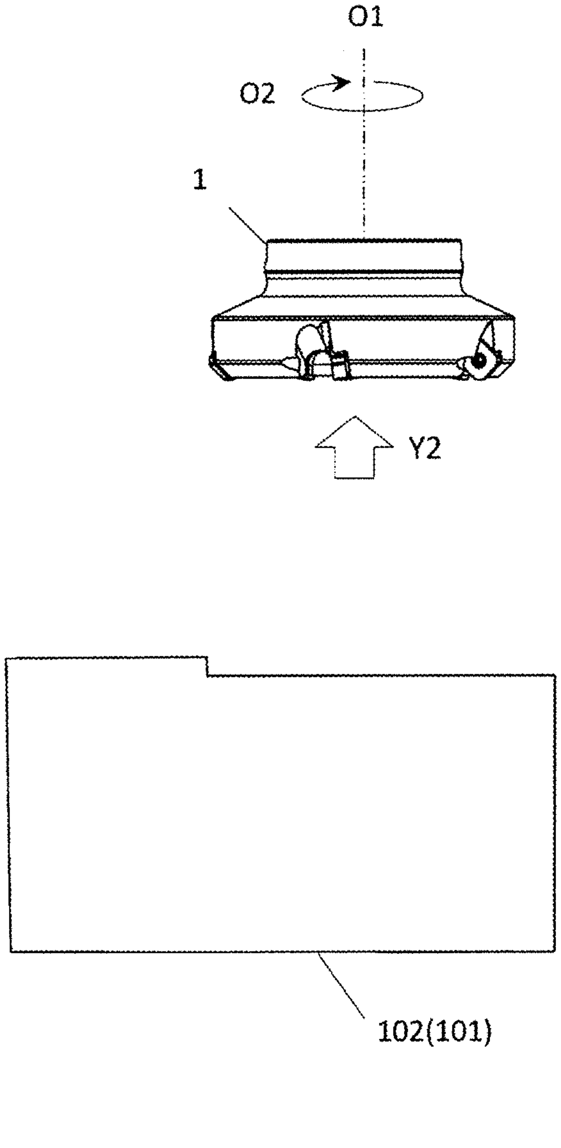
FIG. 13 is a schematic explanatory diagram illustrating one of the steps in the method for manufacturing a machined product in one embodiment.

A method for manufacturing a machined product in a non-limiting embodiment of the present disclosure is described in detail below by exemplifying the case of using the cutting tool 1 in the non-limiting embodiment with reference to FIGS. 11 to 13. FIGS. 11 to 13 illustrate the steps of a machining process of a workpiece 102 as a non-limiting embodiment of the method for manufacturing the machined product 101. The method for manufacturing the machined product 101 in the non-limiting embodiment of the present disclosure may include the following steps (1) to (3).

(1) The cutting tool 1 is brought near the workpiece 102 in a feed direction Y1 by rotating the cutting tool 1 in a rotation direction O2 around a rotation axis O1 (refer to FIG. 11). This step can be carried out, for example, by fixing the workpiece 102 onto a table of a machine tool with the cutting tool 1 attached thereto, and by bringing the cutting tool 1 being rotated near the workpiece 102. In this step, the workpiece 102 and the cutting tool 1 may be brought near each other, and the workpiece 102 may be brought near the cutting tool 1.

(2) The cutting tool 1 being rotated may be brought into contact with a desired position on a surface of the workpiece 102 so as to cut out the workpiece 102 by causing the cutting tool 1 to come closer to the workpiece 102 (refer to FIG. 12). In this step, the cutting edge 9 is brought into contact with the desired position on the surface of the workpiece 102.

(3) The cutting tool 1 is moved away from the workpiece 102 in Y2 direction (refer to FIG. 13). Also in this step, similarly to the above step (1), the cutting tool 1 may be relatively moved away from the workpiece 102. For example, the workpiece 102 may be moved away from the cutting tool 1. Examples of the machining process may include plunge milling, profile milling, and ramping process, in addition to the milling process as in the non-limiting embodiment illustrated in FIG. 13.

It is possible to offer excellent machinability by going through the foregoing steps. In cases where the machining process of the workpiece 102 as described above is carried out a plurality of times, specifically, a plurality of machining processes of a single workpiece 102 are carried out, the step of bringing the cutting tool 1 into contact with different portions of the workpiece 102 may be repeated while keeping the cutting tool 1 rotated.

Examples of material of the workpiece 102 may include carbon steel, alloy steel, stainless steel, cast iron, and nonferrous metals.

DESCRIPTION OF THE REFERENCE NUMERAL

1 cutting tool
3 main body
3A front end (first end)
3B rear end (second end)
5 cutting part
5A first cutting part
7 pocket
7A first pocket
9 cutting edge
11 insert
11A first insert
13 cartridge
13A first cartridge
15 first cutting edge
17 second cutting edge
19 front end surface
21 rear end surface
23 front lateral surface
25 first side
27 second side
29 first corner
31 third cutting edge
33 outer lateral surface
35 inner lateral surface
37 slit
39 bottom part
41 inner wall surface
43 fixture
45 adjustment member
47 end part
49 screw head
51 first coolant hole
53 second coolant hole
101 machined product
102 workpiece
O1 rotation axis
O2 rotation direction
Y1 feed direction
L1, L2 length
S1 first cutting edge position
S2 second cutting edge position
W1, W2 distance
P1, P2, P3 center (line)
N1 bisector
L1 central axis

The invention claimed is:

1. A cutting tool, comprising:
a main body which extends from a front end toward a rear end along a rotation axis, and comprises a pocket located on a side of the front end;
a cutting part located in the pocket; and
a fixture configured to fix the cutting part to the main body,
wherein
the cutting part comprises
a front end surface located on the side of the front end,
a front lateral surface which connects to the front end surface and is located on a front side of the cutting part in a rotation direction of the rotation axis,
an outer lateral surface which connects to the front end surface and the front lateral surface,
an inner lateral surface located on an inner side of the outer lateral surface in a radial direction perpendicular to the rotation axis, and
a cutting edge located on an intersection of the front end surface and the front lateral surface,
the front end surface comprises a slit which is located on a rear side of the cutting edge in the rotation direction, and extends toward the rear end,
the slit opens into the outer lateral surface and the inner lateral surface, and is inclined away from the front lateral surface as the slit extends towards the rear end,
the fixture is located on a rear side of the slit in the rotation direction, and
a distance between the fixture and the slit is larger than a distance between the slit and the cutting edge in front end view.

2. The cutting tool according to claim 1, wherein the slit is parallel to the cutting edge in front end view.

3. The cutting tool according to claim 1, wherein the cutting part comprises an adjustment screw capable of adjusting an amount of elastic deformation of the slit, and the adjustment screw comprises an end part located in the slit.

4. The cutting tool according to claim 3, wherein the end part of the adjustment screw is located closer to an opening in the front end surface than a bottom part in the slit.

5. The cutting tool according to claim 3, wherein the adjustment screw is located closer to the outer lateral surface than the inner lateral surface.

6. The cutting tool according to claim 3, wherein the end part of the adjustment screw has a planar shape.

7. The cutting tool according to claim 3, wherein the adjustment screw includes a portion located on a rear side of the slit in the rotation direction, and a central axis of the adjustment screw extends in a direction perpendicular to a length direction of the slit.

8. The cutting tool according to claim 1, wherein the main body comprises a first coolant hole extending from the rear end toward the front end, the cutting part comprises a cartridge attached to the pocket, and a first insert which is attached to the cartridge and comprises the cutting edge, the cartridge comprises a second coolant hole which extends from the rear end toward the front end, and connects to the first coolant hole, and the second coolant hole opens toward an upper surface of the first insert.

9. The cutting tool according to claim 8, wherein the second coolant hole is located on a front side of the slit in the rotation direction in a cross section view of the cutting part perpendicular to the cutting edge.

10. A method for manufacturing a machined product, the method comprising:

rotating a cutting tool;

bringing the cutting tool into contact with a workpiece; and moving the cutting tool away from the workpiece, wherein the cutting tool comprises:

a main body which extends from a front end toward a rear end along a rotation axis, and comprises a pocket located on a side of the front end;

a cutting part located in the pocket; and a fixture configured to fix the cutting part to the main body, the cutting part comprises a front end surface located on the side of the front end, a front lateral surface which connects to the front end surface and is located on a front side of the cutting part in a rotation direction of the rotation axis, an outer lateral surface which connects to the front end surface and the front lateral surface, an inner lateral surface located on an inner side of the outer lateral surface in a radial direction perpendicular to the rotation axis, and a cutting edge located on an intersection of the front end surface and the front lateral surface, the front end surface comprises a slit which is located on a rear side of the cutting edge in the rotation direction, and extends toward the rear end, the slit opens into the outer lateral surface and the inner lateral surface, and is inclined away from the front lateral surface as the slit extends towards the rear end, the fixture is located on a rear side of the slit in the rotation direction, and a distance between the fixture and the slit is larger than a distance between the slit and the cutting edge in front end view.

11. A cutting tool, comprising:

a main body which extends from a front end toward a rear end along a rotation axis, and comprises a pocket located on a side of the front end; and a cutting part located in the pocket, wherein the cutting part comprises a front end surface located on the side of the front end, a front lateral surface which connects to the front end surface and is located on a front side plane of the cutting part facing a rotation direction of the rotation axis, an outer lateral surface which connects to the front end surface and the front lateral surface, an inner lateral surface located on an inner side of the outer lateral surface in a radial direction perpendicular to the rotation axis, and a cutting edge located on an intersection of the front end surface and the front lateral surface, the front end surface comprises a slit which is located on a rear side of the cutting edge in the rotation direction, and extends toward the rear end, and the slit opens into the outer lateral surface and the inner lateral surface, and is inclined away from the front lateral surface as the slit extends towards the rear end.

* * * * *